3,456,057
PHARMACEUTICAL COMPOSITIONS AND METHODS UTILIZING 3-AMINOTRICYCLO[4.3.1.1$^{3.8}$]UNDECANES
Theodore L. Cairns, Greenville, Del., assignor to E. I. du Pont de Nemours and Company, Wilmington, Del., a corporation of Delaware
No Drawing. Continuation-in-part of application Ser. No. 375,338, June 15, 1964. This application June 28, 1968, Ser. No. 740,983
Int. Cl. A61k 27/00
U.S. Cl. 424—325                                14 Claims

ABSTRACT OF THE DISCLOSURE

This invention relates to pharmaceutical compositions containing a compound of a class of 3-aminotricyclo[4.3.1.1$^{3.8}$]undecanes and to the use of such compositions to control virus infections in warm-blooded animals. Typical compounds useful in these compositions and methods are 3-aminotricyclo[4.3.1.1$^{3.8}$]undecane and 3-N,N-dimethylaminotricyclo[4.3.1.1$^{3.8}$]undecane and the hydrochloride salts of these compounds.

Related applications

This application is a division and continuation-in-part of application Ser. No. 375,338, filed June 15, 1964 (now U.S. Patent No. 3,397,233), which was a continuation-in-part of application Ser. No. 277,134, filed May 1, 1963 (now abandoned).

Summary of the invention

In summary, this invention is directed to a pharmaceutical composition for controlling influenza virus infection in warm-blooded animals comprising a pharmaceutical carrier and an effective amount of a compound of the formula (I)

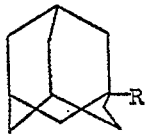

where R is selected from the group consisting of

and

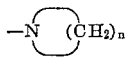

where $n$ is an integer of 4 or 5; $R_1$ is hydrogen, alkyl of from 1 to 5 carbon atoms, alkenyl of from 2 to 6 carbon atoms or alkynyl of from 2 to 5 carbon atoms; and $R_2$ is hydrogen, alkyl of from 1 to 5 carbon atoms, alkenyl of from 2 to 6 carbon atoms, alkynyl of from 2 to 5 carbon atoms or monohydroxyalkyl of 2 or 3 carbon atoms wherein the hydroxyl group is in other than the 1-position; with the proviso that when $R_1$ is an alkenyl or alkynyl having the unsaturated bond in the 1-position, $R_2$ is alkyl or monohydroxyalkyl and with the further proviso that the total number of carbon atoms in $R_1$ and $R_2$ does not exceed 6; and non-toxic salts of said compound.

This invention is also directed to a method of controlling an influenza virus infection in a warm-blooded animal comprising administering to said animal an effective amount of a compound of Formula I.

It will be understood that the use, in the above-described compositions and methods, of a compound hydrolyzable in vivo to a compound of Formula I is contemplated as being within the scope of this invention since for most purposes the two will be equivalent. It will also be understood that "pharmaceutically acceptable acid-addition salts" refers to acid-addition salts having a non-toxic anion. Representative of such salts are hydrochlorides, hydrobromides, sulfates, phosphates, nitrates, acetates, succinates, adipates, propionates, tartrates, citrates, bicarbonates, pamoates, cyclohexylsulfamates and acetylsalicylates. Of these, the hydrochlorides, acetates and cyclohexylsulfamates are preferred. The cyclohexylsulfamates have a pleasant taste and are therefore particularly useful in preparing syrups and uncoated tablets for oral administration.

Detailed description of the invention

This invention is founded on the discovery that compounds of Formula I are useful as antiviral agents. These compounds possess the ability to inhibit and deter the incidence and growth of harmful viruses. Within the class of compounds of this invention an outstanding combinatioon of properties exists, as evidenced by standard tests in both tissue culture and animals. Antiviral activity within this invention has been observed against influenza A/Swine/S15, influenza $A_2$/AA/2/60, influenze $A_2$/Bethesda/10/63 and parainfluenza 1/Sendai.

The monomethyl and monoethyl derivatives and the unsubstituted amino compounds are preferred.

Particularly preferred are the hydrochlorides of the following compounds:

3-aminotricyclo[4.3.1.1$^{3.8}$]undecane
3-(N-methylamino)tricyclo[4.3.1.1$^{3.8}$]undecane
3-(N-ethylamino)tricyclo[4.3.1.1$^{3.8}$]undecane
3-(N,N-dimethylamino)tricyclo[4.3.1.1$^{3.8}$]undecane
3-(N-ethyl-N-methylamino)tricyclo[4.3.1.1$^{3.8}$]undecane
3-(N,N-diethylamino)tricyclo[4.3.1.1$^{3.8}$]undecane.

Representative of other compounds employed in the methods and compositions of this invention are the following compounds and their salts:

3-(N-propylamino)tricyclo[4.3.1.1$^{3.8}$]undecane
3-(N-methyl-N-propylamino)tricyclo[4.3.1.1$^{3.8}$]undecane
3-(N-isopropylamino)tricyclo[4.3.1.1$^{3.8}$]undecane
3-(N-methyl-N-isopropylamino)tricyclo[4.3.1.1$^{3.8}$]undecane
3-(N,N-diisopropylamino)tricyclo[4.3.1.1$^{3.8}$]undecane
3-(N-sec-butylamino)tricyclo[4.3.1.1$^{3.8}$]undecane
3-(N-isobutylamino)tricyclo[4.3.1.1$^{3.8}$]undecane
3-(N-tert-butylamino)tricyclo[4.3.1.1$^{3.8}$]undecane
3-(N-isoamylamino)tricyclo[4.3.1.1$^{3.8}$]undecane
3-(N-methyl-N-vinylamino)tricyclo[4.3.1.1$^{3.8}$]undecane
3-(N-allylamino)tricyclo[4.3.1.1$^{3.8}$]undecane
3-(N-allyl-N-methylamino)tricyclo[4.3.1.1$^{3.8}$]undecane
3-(N,N-diallylamino)tricyclo[4.3.1.1$^{3.8}$]undecane
3-[N-(hexen-3-yl)amino]tricyclo[4.3.1.1$^{3.8}$]undecane
3-(N-ethynyl-N-methylamino)tricyclo[4.3.1.1$^{3.8}$]undecane
3-(N-propargylamino)tricyclo[4.3.1.1$^{3.8}$]undecane
3-(N,N-dipropargylamino)tricyclo[4.3.1.1$^{3.8}$]undecane
3 - [N - (2 - hydroxyethyl)amino]tricyclo[4.3.1.1$^{3.8}$]undecane
3 - [N - (2 - hydroxyethyl) - N - methylamino]tricyclo[4.3.1.1$^{3.8}$]undecane
N-{tricyclo[4.3.1.1$^{3.8}$]undecyl-(3)}pyrrolidine
N-{tricyclo[4.3.1.1$^{3.8}$]undecyl-(3)}piperidine Detailed descriptions of the preparation of the compounds employed in the methods and compositions of this invention are provided in said copending application Ser. No. 375,338. These disclosures and all other disclosures of said copending application not expressly set forth herein are hereby incorporated by reference for a more complete understanding of the invention.

The compounds of Formula I can be administered in the antiviral treatment according to this invention by any means that effects contact thereof with the side of virus infection in the body of a warm-blooded animal. It will be understood that this includes the side prior to infection setting in as well as after. For example, administration can be parenteral, that is subcutaneous, intravenous, intramuscular or intraperitoneal. Alternatively or concurrently, the compounds are effective on administration by the oral route. Since these compounds are particularly effective against respiratory infections such as viral influenza and viral pneumonia, administration can be by vapor or spray through the mouth or nasal passages. The compounds within the scope of this invention are valuable for viral prophylaxis, as well as for therapeutic treatment.

The dosage administred will be dependent upon the virus being treated, the age, health and weight of the recipient, the extent of infection, kind of concurrent treatment, if any, frequency of treatment and the nature of the effect desired. Generally, a daily disage of active ingredient compound will be from about 1 to 50 milligrams per kilogram of body weight, although lower or higher amounts can be used. Ordinarily, from about 1 to 20 milligrams, and preferably from 1 to 10 milligrams, per kilogram per day, in one or more applications per day, is effective to obtain the desired result.

As specific examples of treatment, the compounds shown in Table I below were each administered intraperitoneally to Swiss-Webster mice one-half hour prior to infection with a 20LD$_{50}$ dose of influenza A/Swine/S15 or influenza A$_2$/AA/2/60. An LD$_{50}$ dose is that dose which causes the death of 50% of a group of non-treated mice within the test period; in these experiments the test period was twelve days. The mean survivor day (MSD) for each group of mice receiving the same test compound was calculated as follows:

$$MSD = \frac{\Sigma[f(d-1)]}{N}$$

where $f$ is the number of mice reported dead on day ($d$) and N is the number of mice in the test group. From the MSD is calculated the AVI$_{50}$ which is the amount of test compound required to reduce the infection to a level equivalent to a redutcion of one-half log of the virus inoculum. Stated differently, the AVI$_{50}$ is that dose, expressed in milligrams of test compound per kilogram of body weight, which causes an apparent 3.2-fold decrease in the infectivity of the virus.

TABLE I

| Compound | Influenza virus | AVI$_{50}$ |
|---|---|---|
| 3-aminotricyclo[4.3.1.1$^{3.8}$]undecane | A/Swine/S-15 | 3.5 |
|  | A$_2$/AA/2/60 | 6.6 |
| 3-(N-methylamino)tricyclo[4.3.1.1$^{3.8}$]-undecane hydrochloride. | A/Swine/S-15 | 13 |

As further examples of treatment the Least Effective Doses (LED) shown in Table II below are the smallest doses of the test compounds which caused a statistically significant difference in the mean survival time of the treated test animal as compared with that of the untreated control animal. Influenza A$_2$/Bethesda/10/63 was administered to Swiss-Webster mice in their drinking water.

Table II

Compound:                   LED (mg./kg./72 hrs.)
3 - N,N - dimethylaminotricyclo[4.3.1.1$^{3.8}$]undecane hydrochloride _____ 25.0
3 - (N-ethylamino)tricyclo[4.3.1.1$^{3.8}$]undecane hydrochloride _____ 33.9
3-(N-methyl-N-ethylamino)tricyclo[4.3.1.1$^{3.8}$]undecane hydrochloride _____ 13.0

The active ingredients of Formula I can be employed in useful compositions according to the present invention in such dosage forms as tablets, capsules, powder packets, or liquid solutions, suspensions or elixirs, for oral administration or liquid solutions for parenteral use and in certain cases, suspensions for parenteral use (except intravenous). In such compositions the active ingredient will ordinarily always be present in an amount of at least 0.5% by weight based on the total weight of the composition and not more than 90% by weight. Besides the active ingredient of Formula I the antiviral composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 30 to 60% by weight of a compound of Formula I and 70 to 40% of a carrier. In another embodiment, the active ingredient is tableted with or without adjuvants. In yet another embodiments, the active ingredient is put into powder packets and employed. These capsules, tablets and powders will generally constitute from about 5% to about 95%, and preferably from 25% to 90% by weight of carrier and from about 95% to about 5%, and preferably about 75% to about 10% by weight of active ingredient. These dosage forms preferably contain from about 1 to about 500 milligrams of active ingredient, with from 25 to about 250 milligrams being most preferred.

The pharmaceutical carrier can, as previously indicated, be a sterile liquid such as water and oils, including those of petroleum, animal, vegetable or synthetic origin, for example, peanut oil, soybean oil, mineral oil and sesame oil. In general, water, saline, aqueous dextrose (glucose) and related sugar slutions and glycols such as propylene glycol or polyethylene glycols are preferred liquid carriers, particularly for injectible solutions. Sterile injectible solutions such as saline will ordinarily contain from about 0.1 to 10% and preferably about 0.5 to 5% by weight of the active ingredient.

As mentioned above, oral administration can be in a suitable suspension or syrup, in which the active ingredient ordinarily will constitute from about 0.05 to 10% and preferably about 0.1 to 5% by weight. The pharmaceutical carrier in such composition can be a watery vehicle such as an aromatic water, a syrup or a pharmaceutical mucilage.

Suitable pharmaceutical carriers are described in "Remington's Pharmaceutical Sciences" by E. W. Martin, a well-known reference text in this field.

In addition to the exemplary illustrations above, the following examples further explain the present invention:

EXAMPLE 1

A large number of unit capsules are prepared by filling standard two-piece hard gelatin capsules weighing about 50 milligrams each with 50 milligrams of powdered 3-aminotricyclo[4.3.1.1$^{3.8}$]undecane hydrochloride; 125 milligrams of lactose and 1 milligram of "Cab-O-Sil."

EXAMPLE 2

Example 1 is repeated except that soft gelatin capsules are used and the powdered 3-aminotricyclo[4.3.1.1$^{3.8}$]undecane hydrochloride is first dissolved in mineral oil.

EXAMPLE 3

Example 1 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used, by applying appropriate coatings such as sugar-base coatings well known to the art.

EXAMPLE 4

A parenteral composition suitable for administration by injection is prepared by stirring 5% by weight of the active ingredient of Example 1 in sterile aqueous 0.9% saline.

A large variety of compositions according to this invention can thus readily be made by substituting other compounds of this invention, and includig specifically but not limited to compounds of this invention that have specifically been named hereinbefore. The compounds will be used in the amounts indicated in accordance with procedures well known and described in the Martin text mentioned above.

The compounds of Formula I are antiviral agents in domestic animals and livestock. As an illustration, the compouds of Formula I are effetcive against swine influenza and an embodiment of this invention, therefore, is the control of this infection by incorporating an active ingredient in the diet of the aimal. For most purposes, an amount of active compound will be used to provide from about 0.0001% to 0.1% and preferably from 0.001% to 0.02%, by weight of the active compound based on the total weight of feed intake.

Thus, novel and useful compositions are provided by this invention which comprise at least one active ingredient compound within the scope of this invention in admixture with an animal feed. Descriptions of suitable feeds can be found in the book, "Feeds and Feeding," by Frank B. Morrison, published by the Morrison Publishing Company, Ithaca, N.Y., 1948, 21st edition. The selection of the particular feed is within the knowledge of the art and will depend of course on the animal, the economics, natural materials available, the surrounding circumstances and the nature of the effect desired, as will be readily understood.

Particularly important composition according to this feature of the invention is a concentrate, suitable for preparation and sale to a farmer or livestock grower for addition to the animal's feedstuffs in appropriate proportion. These concentrates ordinarily comprise about 0.5% to about 95% by weight of the active compound together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can be used, these latter materials also acting as solid dispersing agents.

The feed compositions, as well as the just described concentrates, can additionally contain other components of feed concentrates or animal feeds, as will be readily understood. Other particularly important additives include proteins, carbohydrates, fats, vitamins, minerals, antibiotics, etc.

The following example will further illustrate this aspect of this invention:

EXAMPLE 5

A feed for pigs is prepared as follows:

|  | Pounds |
|---|---|
| Oat groats | 350 |
| Yellow corn, ground | 1000 |
| Molasses | 100 |
| Soybean meal | 450 |
| Dried skim milk | 100 |
| Ground limestone | 20 |
| Dicalcium phosphate | 20 |
| Salt plus trace mineral mix | 10 |
| Standard vitamin premix | 1 |
|  | 2051 |

There is added to the pigs' diet a concentration of 50% of 3-amintricyclo[4.3.1.1$^{3.8}$]undecane hydrochloride as the active ingredient and 50% by weight corn flour, in an amount that provides 0.015% by weight of the active ingredient based on the total diet.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

What is claimed is:

1. A method of controlling an influenza virus infection in a warm-blooded animal comprising administering to said animal an effective amount of a compound of the formula

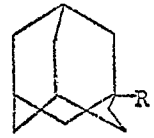

where R is selected from the group consisting of

and

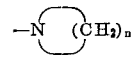

where $n$ is an integer of 4 or 5; $R_1$ is hydrogen, alkyl of from 1 to 5 carbon atom, alkenyl of from 2 to 6 carbon atoms or alkynyl of from 2 to 5 carbon atoms; and $R_2$ is hydrogen, alkyl of from 1 to 5 carbon atoms, alkenyl of from 2 to 6 carbon atoms, alkynyl of from 2 to 5 carbon atoms of monohydroxyalkyl of 2 or 3 carbon atoms wherein the hydroxyl group is in other than the 1-position; with the proviso that when $R_1$ is an alkenyl or alkynyl having the unsaturated bond in the 1-position, $R_2$ is alkyl or monohydroxyalkyl and with the further proviso that the total number of carbon atoms in $R_1$ and $R_2$ does not exceed 6; and nontoxic salts of said compound.

2. The method of claim 1 wherein said compound is 3-aminotricyclo[4.3.1.1$^{3.8}$]undecane hydrochloride.

3. The method of claim 1 wherein said compound is 3-(N-methylamino)tricyclo[4.3.1.1$^{3.8}$]undecane hydrochloride.

4. The method of claim 1 wherein said compound is 3-(N-ethylamino)tricyclo[4.3.1.1$^{3.8}$]undecane hydrochloride.

5. The method of claim 1 wherein said compound is 3-(N,N-dimethylamino)tricyclo[4.3.1.1$^{3.8}$]undecane hydrochloride.

6. The method of claim 1 wherein said compound is 3-(N-ethyl-N-methylamino)tricyclo[4.3.1.1$^{3.8}$]undecane hydrochloride.

7. The method of claim 1 wherein said compound is 3-(N,N-diethylamino)tricyclo[4.3.1.1$^{3.8}$]undecane hydrochloride.

8. A pharmaceutical composition for controlling influenza virus infection in warm-blooded animals comprising a pharmaceutical carrier and an effective amount of a compound of the formula

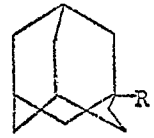

where R is selected from the group consisting of

and

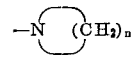

where $n$ is an integer of 4 or 5; $R_1$ is hydrogen, alkyl of from 1 to 5 carbon atoms, alkenyl of from 2 to 6 carbon atoms or alkynyl of from 2 to 5 carbon atoms; and $R_2$ is hydrogen, alkyl of from 1 to 5 carbon atoms, alkenyl of from 2 to 6 carbon atoms, alkynyl of from 2 to 5 carbon atoms or monohydroxyalkyl of 2 or 3 carbon atoms wherein the hydroxyl group is in other than the 1-position; with the proviso that when $R_1$ is an alkenyl or alkynyl having the unsaturated bond in the 1-position, $R_2$ is alkyl or monohydroxyalkyl and with the further proviso that the total number of carbon atoms in $R_1$ and $R_2$ does not exceed 6; and nontoxic salts of said compound.

9. The composition of claim 8 wherein said compound is 3-aminotricyclo[4.3.1.1$^{3.8}$]undecane hydrochloride.

10. The composition of claim 8 wherein said compound is 3-(N-methylamino)tricyclo[4.3.1.1$^{3.8}$]undecane hydrochloride.

11. The composition of claim 8 wherein said compound is 3-(N-ethylamino)tricyclo[4.3.1.1$^{3.8}$]undecane hydrochoride.

12. The composition of claim 8 wherein said compound is 3-(N,N-dimethylamino)tricyclo[4.3.1.1$^{3.8}$]undecane hydrochloride.

13. The composition of claim 8 wherein said compound is 3-(N-ethyl-N-methylamino)tricyclo[4.3.1.1$^{3.8}$]undecane hydrochloride.

14. The composition of claim 8 wherein said compound is 3-(N,N - diethylamino)tricyclo[4.3.1.1$^{3.8}$]undecane hydrochloride.

References Cited

UNITED STATES PATENTS

| | | | |
|---|---|---|---|
| 3,257,456 | 6/1966 | Smith | 424—325 |
| 3,310,469 | 3/1967 | Paulshock et al. | 424—325 |
| 3,328,251 | 6/1967 | Smith | 424—325 |
| 3,352,919 | 11/1967 | Prichard | 424—325 |

FRANK CACCIAPAGLIA, Jr., Primary Examiner

J. D. GOLDBERG, Assistant Examiner

U.S. Cl. X.R.

424—267, 274